US 6,731,395 B1

(12) United States Patent
Shiohara

(10) Patent No.: US 6,731,395 B1
(45) Date of Patent: May 4, 2004

(54) NETWORK PRINTER WITH WATCH DOG TIMER

(75) Inventor: Susumu Shiohara, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/417,363

(22) Filed: Oct. 13, 1999

(30) Foreign Application Priority Data

Oct. 14, 1998 (JP) ............................................ 10-292437

(51) Int. Cl.[7] .................................................. G06K 15/00
(52) U.S. Cl. ....................................... 358/1.15; 358/1.1
(58) Field of Search ........................... 358/1.1, 1.7, 1.9, 358/1.13, 1.14, 1.15, 400, 500; 370/257, 362, 353, 402, 490, 449; 709/203, 224, 221, 228; 710/8, 16, 48, 206

(56) References Cited

U.S. PATENT DOCUMENTS

| | | | | |
|---|---|---|---|---|
| 5,651,114 A | * | 7/1997 | Davidson, Jr. ............... | 704/229 |
| 5,699,494 A | * | 12/1997 | Colbert et al. .............. | 358/1.15 |
| 5,727,135 A | * | 3/1998 | Webb et al. ................ | 358/1.14 |
| 5,784,622 A | * | 7/1998 | Kalwitz et al. ............. | 716/200 |
| 6,560,222 B1 | * | 5/2003 | Pounds et al. .............. | 370/353 |

* cited by examiner

*Primary Examiner*—Gabriel Garcia
(74) *Attorney, Agent, or Firm*—Sughrue Mion, PLLC

(57) ABSTRACT

A single CPU within a network printer executes in multiplex a communication task for extracting print job data from a packet received from the network in accordance with the communication protocol, a language task for interpreting the print job data, and a print task for generating raster image to be sent to a print engine on the basis of the result of the interpretation. Further, the CPU includes a watch dog timer (WDT) task which is activated by the communication task. The WDT task operates in a manner that, when the communication task is blocked for a long time due to the busy state of the language task and the print task and can not return a response to the network, the WDT task returns a response of busy to the network before the transmission originator disconnects the connection to the network thereby to maintain the connection, so that a succeeding packet can be received from the transmission originator when the communication task is released from the blocked state later.

8 Claims, 4 Drawing Sheets

NETWORK PRINTER WITH WATCH DOG TIMER

BACKGROUND OF THE INVENTION

1. Field of the Invention

The present invention relates to a network printer having a function for receiving print job data from a communication network and printing the data.

The present application is based on Japanese Patent Application No. Hei. 10-292437, which is incorporated herein by reference.

2. Description of the Related Art

FIG. 1 shows an arrangement of a conventional network printer.

A printer 1 normally includes a parallel interface (I/F) 11 so that the printer can be directly connected to a host computer 3, the number of which is usually one, through a dedicated cable 7 in one to one correspondence by means of the parallel interface 11. In the case where the printer 1 is commonly used by a plurality of host computers in a company or the like, the printer 1 is coupled to a communication network 9 such as a local area network (LAN) within the company. In this case, a network interface board 5 as an optional part is additionally installed within the printer 1, whereby the communication network 9 is coupled to the printer 1 through the network interface board 5.

The network interface board 5 includes its own central processing unit (CPU) 23 which operates a synchronously with a CPU 17 of the printer 1. The CPU 23 executes the communication protocol thereby to extract print job data from a packet received through the communication network 9 to temporarily store the print job data in a dynamic random access memory (DRAM) 25 on the board 5 and thereafter to send the print job data thus stored to the printer 1.

As described above, the conventional printer requires the network interface board 5 in the case of coupling the printer to the network. However, the network interface board 5 includes the own CPU 23 and the DRAM 25, and further the CPU 23 operates at a high speed and the DRAM 25 has a large capacity in order to attain the high-performance, and so they are expensive consequentially. Thus, the network interface board is very expensive.

In the case of performing the two-way communications between the printer and the host computer, the complicated protocol corresponding to the two-way communications is required at two portions, that is a portion between the host computer 3 and the network interface board 5 and a portion between the network interface board 5 and the main body of the printer. Further, due to the presence of the network interface board 5, an amount of data to be copied between memories becomes large. As a result, the performance of the printer degrades, which results in a serious problem at the time of developing a high-speed network printer.

SUMMARY OF THE INVENTION

Accordingly, an object of the present invention is to provide a cheaper network printer.

Another object of the present invention is to provide a network printer which does not require a network interface board.

A still another object of the present invention is to provide a high-speed network printer.

A still another object of the present invention is to provide a network printer which can perform the network communication and the processing of print job without any, trouble by using a single CPU.

In order to achieve the aforesaid object, the network printer according to the present invention includes a network interface, coupled to the communication network, for receiving a packet from the communication network, a CPU, a RAM used by the CPU and having a print data buffer for storing print job data, a print image generation means for generating image data on a basis of a result of interpretation of the print job data performed by the CPU, and a print mechanism for printing image on a recording medium on a basis of the image data.

The CPU includes: (1) a communication processing means which discriminates a communication protocol used in the communication network from a packet received by the network interface circuit, extracts print job data from the received packet in accordance with the discriminated communication protocol and writes the extracted print job data into the print data buffer, and then returns a first response representing reception of the packet toward the communication network, (2) a language processing means which interprets the print job data within the print data buffer, and (3) a watch dog timer means which, in a case where the discriminated communication protocol is such a kind of protocol that a transmission side disconnects a connection to a receiving side when the transmission side does not receive a response from the receiving side within a limit time period after transmission of the packet, returns a predetermined second response within the limit time period toward the communication network in place of the communication processing means when the communication processing means does not return a response representing reception of the packet within the limit time period.

According to such a network printer, since the single CPU performs both the communication processing with the network and the language processing of the received print job data, it is not necessary to provide a network interface board with its own CPU. Thus, the network printer can be made cheap and the high-speed network printer can be easily realized.

In the case of performing both the communication processing and the language processing by using a single CPU, if the language processing can not be proceeded due to the shortage of the capacity of the RAM or the occurrence of error and a vacant area of the print data buffer becomes zero, the communication processing is also blocked, whereby a response can not be returned to the transmission originator on the network. In this state, in the case of using some kind of communication protocol, the transmission originator determines that the receiving side is in a failure state thereby to disconnect the communication line if a response is not returned from the receiving side within the predetermined limit time period. In such a case, even if the communication processing means is released from the blocked state later, the receiving side can not receive a succeeding packet from the transmission originator, so that the complete printing operation can not be performed. In contrast, according to the network printer of the present invention, since the watch dog timer means returns a suitable response (for example, a response representing a busy state) to the transmission originator in place of the communication processing means even if the communication processing means is blocked, the transmission originator does not disconnect the connection. Thus, when the communication processing means is released from the blocked state later, the receiving side can receive a succeeding packet from the transmission originator and continue the printing processing.

According to a preferred embodiment, the watch dog timer means is activated substantially when the network interface circuit receives the packet to count during a predetermined period shorter than the limit time period so long as the communication processing means does not return a response, and returns a response representing a busy state or the like due to time-out of the count.

According to a preferred embodiment, the communication processing means activates the watch dog timer means when the communication processing means discriminates the communication protocol to determine that the discriminated communication protocol is such a predetermined kind of protocol that the transmission side disconnects a connection to the receiving side when the transmission side does not receive a response from the receiving side within the limit time period.

According to a preferred embodiment, the RAM includes a network work memory for storing the packet in addition to the print data buffer, and the CPU is adapted to, when the network interface circuit receives the packet, activate the interruption processing thereby to write the received packet into the network work memory. Further, the communication processing means, the language processing means and the watch dog timer (WDT) means are executed as tasks (communication task, language task and WDT task) of the CPU, respectively. Furthermore, the aforesaid image generation means is also executed as a task (print task) of the CPU.

According to a preferred embodiment, of the communication task, the language task and the print task, the print task is provided with a highest priority level, the communication task is provided with a secondary priority level, and the language task is provided with a lowest priority level. The WDT task is executed in association with the communication task.

Features and advantages of the invention will be evident from the following detailed description of the preferred embodiments described in conjunction with attached drawings.

DETAILED DESCRIPTION OF THE PREFERRED EMBODIMENTS

Figure 2:
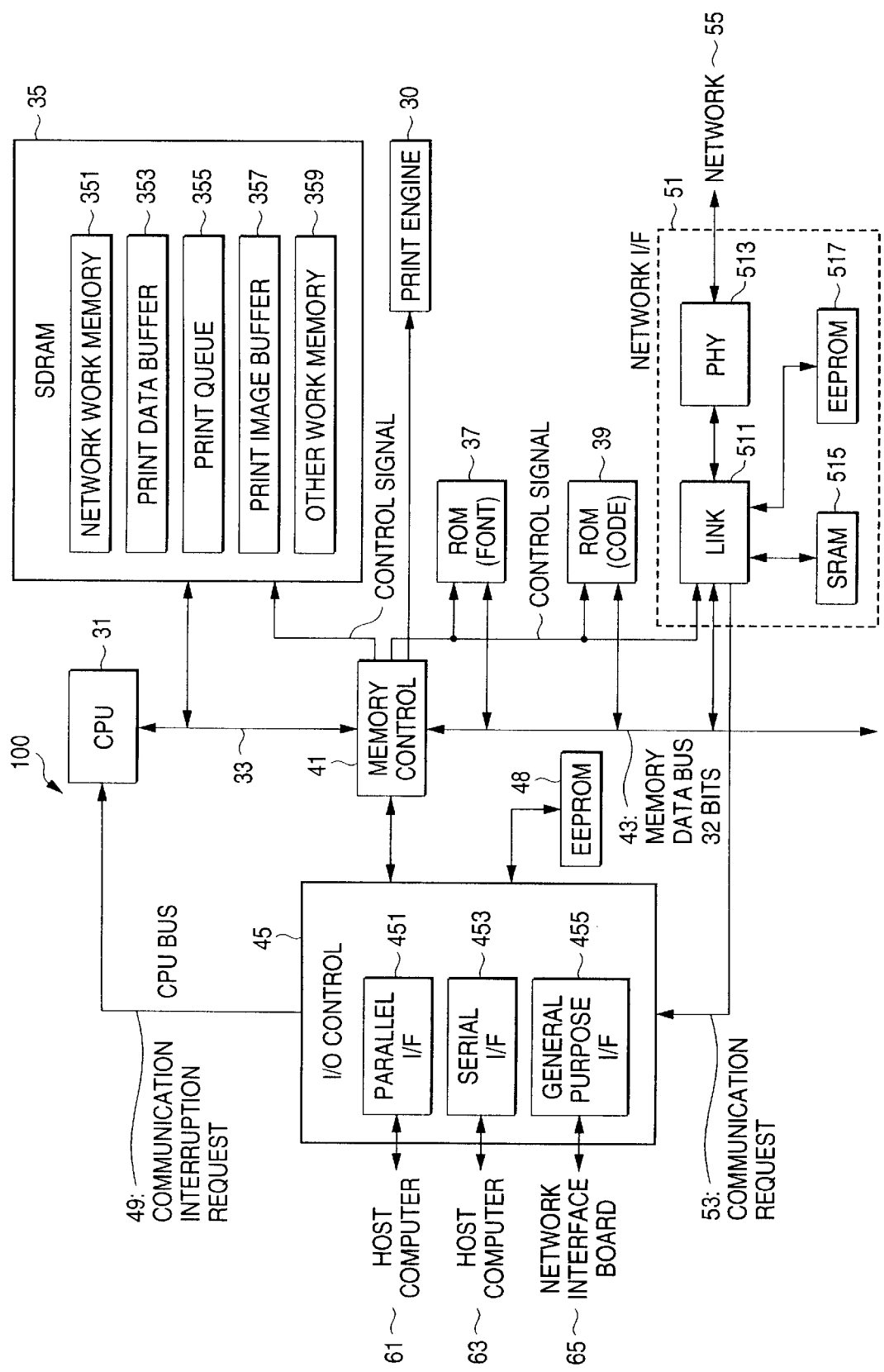
FIG. 2 is a block diagram showing the arrangement of the main portion of a network printer according to an embodiment of the present invention.

FIG. 2 is the arrangement showing the main portion of a network printer according to an embodiment of the present invention.

A printer 100 includes a print engine 30 which executes the electrophotographic process, for example, to form an actual image on a paper, and a CPU 31 which generates raster image data to be sent to the print engine 30 on the basis of print job data received from an external host computer (not shown).

A system bus 33 of the CPU 31 is connected to a SDRAM (synchronous DRAM) 35 of a large capacity suitable for high-speed accessing. The SDRAM 35 is used as a network work memory 351 for storing a packet received from a network, as a print data buffer 353 for storing the print job data, as a print queue 355 for sequentially storing print requests in a page unit which are generated from the print job data, as a print image buffer 357 for storing the raster image generated from the print request for each page, and as an other work memory 359 for the CPU 31.

Further, a character ROM 37 storing character fonts and a program ROM 39 storing program codes for the CPU 31 are connected to a memory data bus 43.

An input/output control circuit 45 has a parallel interface circuit 451, a serial interface circuit 453 and a third general purpose interface circuit 455. The parallel interface circuit 451 and the serial interface circuit 453 can be connected to host computers 61, 63, for example, through dedicated cables, respectively. The general purpose interface circuit 455 can be connected to a conventional option network interface board 65, for example (when the conventional option network interface board is additionally provided and used together with a normally-provided network interface circuit 51 described later, the printer 100 can be connected to two different networks, respectively). The input/output control circuit 45 is connected to a bus 47 for inputting and outputting data from and to the CPU 31 side. The input/output control circuit 45 is connected to an EEPROM 48 in which status setting information such as the resolution of the printer 100, paper size or the like (this information is rewritten by a user as the need arises).

The memory control circuit 41 is connected to the aforesaid system bus 33 for the CPU, the memory data bus 43 and the bus 47 which is connected to the input/output control circuit 45. The memory control circuit 41 has a function of reading data from the ROMs 37, 39 and reading/writing data from/into the SDRAM 35 in accordance with an instruction from the CPU 31. The memory control circuit 41 contains a direct memory access (DMA) controller therein and has a function of writing the print job data from the input/output control circuit 45 described later into the print data buffer 353 of the SDRAM 35 in a dynamic memory access manner and transferring the raster image within the print image buffer 357 of the SDRAM 35 to the print engine 30 in a dynamic memory access manner.

The memory data bus 43 is further connected to the network interface circuit 51 for connecting it to a network 55. The network interface circuit 51 has a physical layer control circuit 513 and a data link layer control circuit 511. The physical layer control circuit 513 controls the physical layer of the network communication protocol, that is, performs the conversion between an electric signal on the network 55 and an electric signal (for example, TTL signal) within the network interface circuit 51. The data link layer control circuit 511 controls the data link layer of the network communication protocol, that is, performs such a processing that headers and footers to the data link layer are extracted from packets received from the network 55 and packets destined for this printer 100 are discriminated and extracted on the basis of the destination network addresses (for example, destination IP address) contained within the extracted headers and footers. The data link layer control circuit 511 has a SRAM 515 of a small capacity and an EEPROM 517. The packets destined for the printer 100 extracted by the data link layer control circuit 511 are temporarily stored in the SRAM 515. The EEPROM 517 stores the IP address etc. of the printer 100 (unlike the aforesaid status setting information of the EEPROM 48, this address can not be rewritten by a user at any time).

The functions of the main elements of the aforesaid arrangement will be explained hereinafter.

As described above, the data link layer control circuit 511 of the network interface circuit 51 extracts the packets destined for the printer 100 among packets received from the network 55 and writes the extracted packets into the SRAM 515, and then sends a communication request to the input/output control circuit 45 through a signal line 53 when a predetermined amount of packets is stored in the SRAM 515.

When the input/output control circuit 45 receives the communication request, the input/output control circuit sends a communication interruption request to the CPU 31 through a signal line 49. Further, when the input/output control circuit 45 receives the data of a single unit (for example, 1 byte) from the own interface circuits 451, 453, 455, the input/output control circuit sends a DMA request to the memory control circuit 41.

In the communication interruption processing of the CPU 31 described later, the memory control circuit 41 reads the packet from the SRAM 515 of the network interface circuit 51 and sends the packet thus read to the CPU 31 in response to an instruction from the CPU 31. When the memory control circuit 41 receives the DMA request from the input/output control circuit 45, the memory control circuit reads from the input/output control circuit 45 the data received by the input/output control circuit 45 and writes the data thus read into the print data buffer 353 of the SDRAM 35 in the dynamic memory access manner.

The CPU 31 executes three tasks of a communication task, a language task and a print task and further executes some interruption processing. One of the interruption processing is a communication interruption, the execution of which is started in response to the aforesaid communication interruption request from the input/output control circuit 45 (that is, the communication request from the network interface circuit 51). In the communication interruption, as described above, the CPU 31 receives a packet from the network interface circuit 51 through the memory control circuit 41 and writes the packet thus received into the network work memory 351 of the SDRAM 35.

Figure 3:
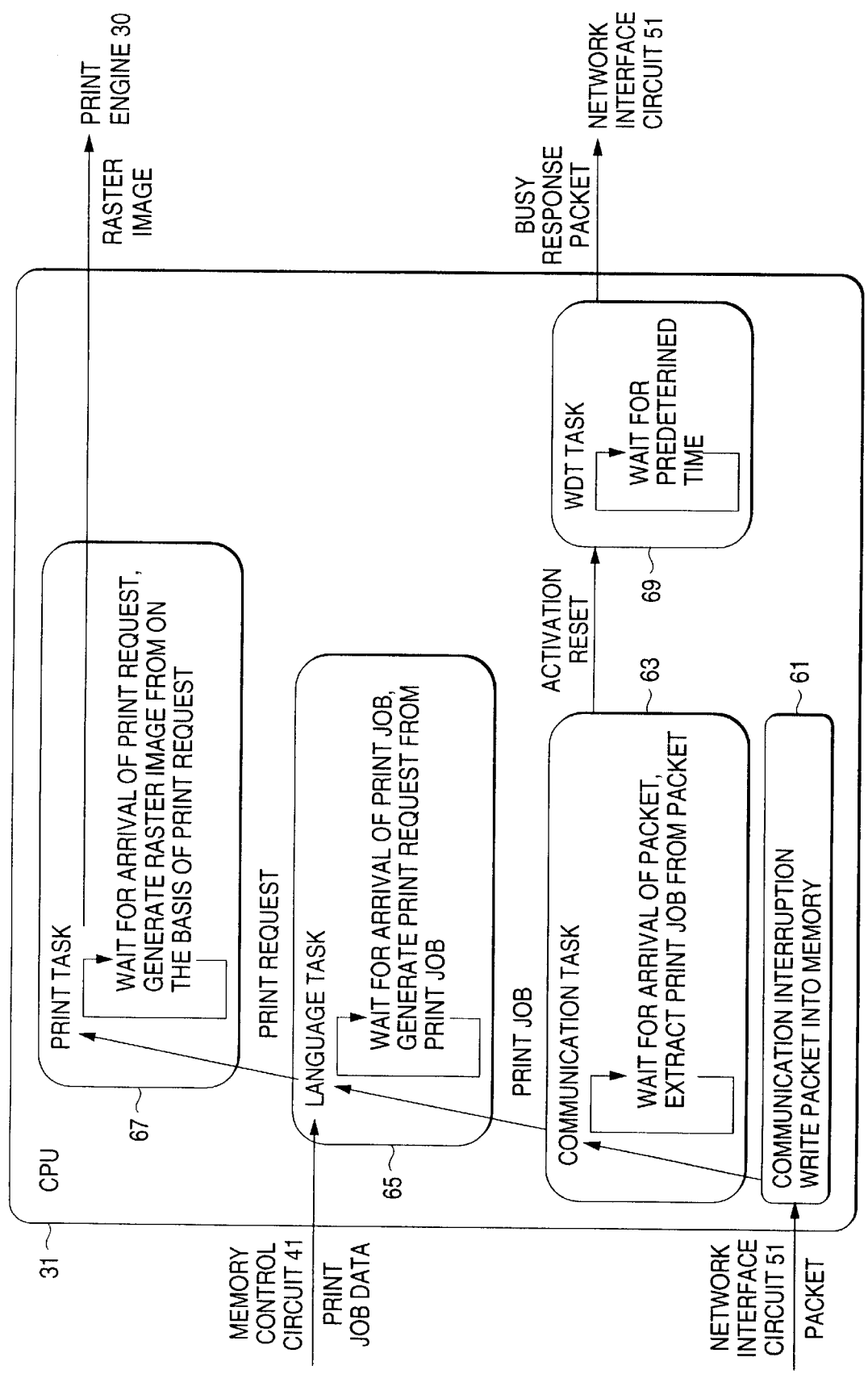
FIG. 3 is a diagram for explaining three tasks of a CPU 31.

FIG. 3 is a diagram showing the three tasks of the communication, language and print tasks of the CPU 31.

The communication task 63 of the CPU 31 operates to wait for a packet being written into the network work memory 351 of the SDRAM 35 by the aforesaid communication interruption 61, then, when the packet is written, firstly to discriminate the kind (for example, TCP/IP, NetBIOS etc.) of the communication protocol as to the packet on the network work memory 351, to remove a header and a footer unnecessary for printing from the packet in accordance with the discriminated communication protocol thereby to extract print job data, and to write the print job data thus extracted into the print data buffer 353 of the SDRAM 35. The communication task 63 continuously operates, so long as there is a vacant area in the print data buffer 353, to receive packets and extract print job data from the received packets, and to write the print job data thus extracted into the print data buffer 353.

The language task 65 of the CPU 31 operates to wait for the print job data being written into the print data buffer 353 of the SDRAM 35 by the communication task 63 or the dynamic memory access operation of the memory control circuit 41, then, when the print job data is written, to read and interpret the print job data thus written thereby to generate print requests on a page unit basis, and to write the print requests into the print queue 355 of the SDRAM 35.

The print task 67 of the CPU 31 operates to wait for the print request being written into the print queue 355 by the aforesaid language task 65, then, when the print request is written, to read the print request thus written from the print queue 355 thereby to generate raster image on the basis of the print request, and to develop the raster image within the print image buffer 357 of the SDRAM 35. The raster image thus developed in the print image buffer is transferred to the print engine 30 by the dynamic memory access process of the memory control circuit 41 in the manner described above.

These three tasks of the communication task 63, language task 65 and print task 67 are provided with priority levels in advance, respectively. The CPU 31 executes the task with a higher priority level in preference to the task with a lower priority. In the case of using the print engine 30 of an electrophotographic type, the task with the highest priority level is the print task 67. This is because it is required to generate the raster image of a page to be printed so as not to delay for the print speed of the print engine while the print engine 30 operates to transfer and print sheets. The task with the secondary priority level is the communication task 63. This is because, when the CPU starts to receive packets from the network 55, it is desired to receive all the packets in a time period as shorter as possible thereby to release the host computer of the transmission originator from the transmission operation as early as possible. The task with the lowest priority level is the language task 65. This is because if the priority level of the language task 65 is higher than that of the communication task 63, the communication task 63 can not receive the succeeding packet until the language task completes the interpretation of all the print job data having received. Accordingly, the language task 65 is executed to generate the print request when each of the print task 67 and the communication task 63 is in a stand-by state.

Then, the schematic operation of the network printer 100 from the data reception to the generating of the raster image will be explained.

The operation in the case where the network interface circuit 51 receives data from the network 55 is performed in the order of the following processes (1) to (4).

(1) When the network interface circuit 51 receives packets from the network 55, the communication interruption request is issued to the CPU 31 when the predetermined amount of packets are stored in the SRAM 515.

(2) Then, the CPU 31 executes the communication interruption 61 to read the packets from the network interface, circuit 51 thereby to write the packets thus read into the network work memory 351 of the SDRAM 35.

(3) Then, the CPU 31 executes the communication task 63 to removes headers and hooters unnecessary for printing from the packets stored in the network work memory 351 thereby to extract and copy the net print job data in the print data buffer 353.

(4) Then, the CPU 31 executes the language task 65 to read the print job data within the print data buffer 353 to generate the print requests on a page unit basis and to write the print requests into the print queue 355, and thereafter the CPU executes the print task 67 to converts the print requests into the raster image thereby to write the raster image into the print image buffer 357.

Then, the operation in the case of receiving data in the parallel, serial or general purpose interface of the input/output control circuit 45 is performed in the order of the following processes (1) to (6).

(1) The CPU 31 sets a parameter to the DMA controller of the memory control circuit 41 so that the data from the input/output control circuit 45 is written into the print data buffer 353 of the SDRAM 35 by an amount of a designated size.

(2) When the input/output control circuit 45 receives the data of a single unit (for example, 1byte) from the host computers 61, 63 or the like, the input/output control circuit issues the DMA request to the memory control circuit 41.

(3) Then, the memory control circuit 41 writes the data received by the input/output control circuit 45 into the print data buffer 353 of the SDRAM 35 in the direct memory access process.

(4) The aforesaid processes (2) and (3) are repeatedly performed until an amount of the received data written into the print data buffer 353 becomes the designated size set in the memory control circuit 41 in the aforesaid process (1).

(5) When the memory control circuit 41 completes the writing of the received data into the print data buffer by an amount of the designated size set in the aforesaid process (1), the memory control circuit issues an interruption request to the CPU 31.

(6) Then, the CPU 31 executes the language task 65 to read the print job data within the print data buffer 353 to generate the print requests on a page unit basis and to write the print requests into the print queue 355, and thereafter the CPU executes the print task 67 to converts the print requests into the raster image thereby to write the raster image into the print image buffer 357.

The explanation will be made with reference to FIG. 3 again. As shown in FIG. 3, the CPU 31 includes a watch dog timer (WDT) task 69 in addition to the aforesaid communication, language and print tasks 63–67. The WDT task 69 is activated by the communication task 63 in case of necessity (needed or unneeded depending on the communication protocol), and serves to return a suitable response to the transmission originator on the network 55 in place of the communication task 63 when the communication task 63 is blocked (the state where the process can not be proceeded, typically, the state where the print job data extracted from a packet can not be written into the print data buffer 353).

That is, if the language task 65 or the print task 67 becomes busy and can not complete its processing, the communication task 63 is blocked. In particular, in the case where the capacity of the print data buffer 353 becomes shortage and there is no vacant area therein until the completion of the paper exhaust or the case where an error arises such as a paper jamming, the communication task 63 is kept to be blocked for a long time. The communication task 63 can not return a response to the network 55 while being blocked of many communication protocols, such a protocol as TCP/IP is defined in a manner that the transmission originator waits for a response all the time until receiving the response from the receiving side and restarts the transmission when receives the response. In contrast, such a protocol as NetBIOS is defined in a manner that when the transmission originator does not receive a response from the receiving side even if waiting for the response for a predetermined limit time period (for example, 30 seconds), it is recognized that the receiving side is in a failure state thereby to disconnect the connection to the receiving side, and the transmission is not reopened even if a response is received thereafter. When the communication is performed in accordance with the former protocol, there arises no problem even if the communication task 63 is blocked for a long time. In contrast, in the case where the communication is performed in accordance with the latter protocol, if the communication task 63 is blocked for the predetermined limit time period or more, the connection to the network 55 is disconnected by the partner side host computer, and so the printing operation can not be completed.

Figure 1:
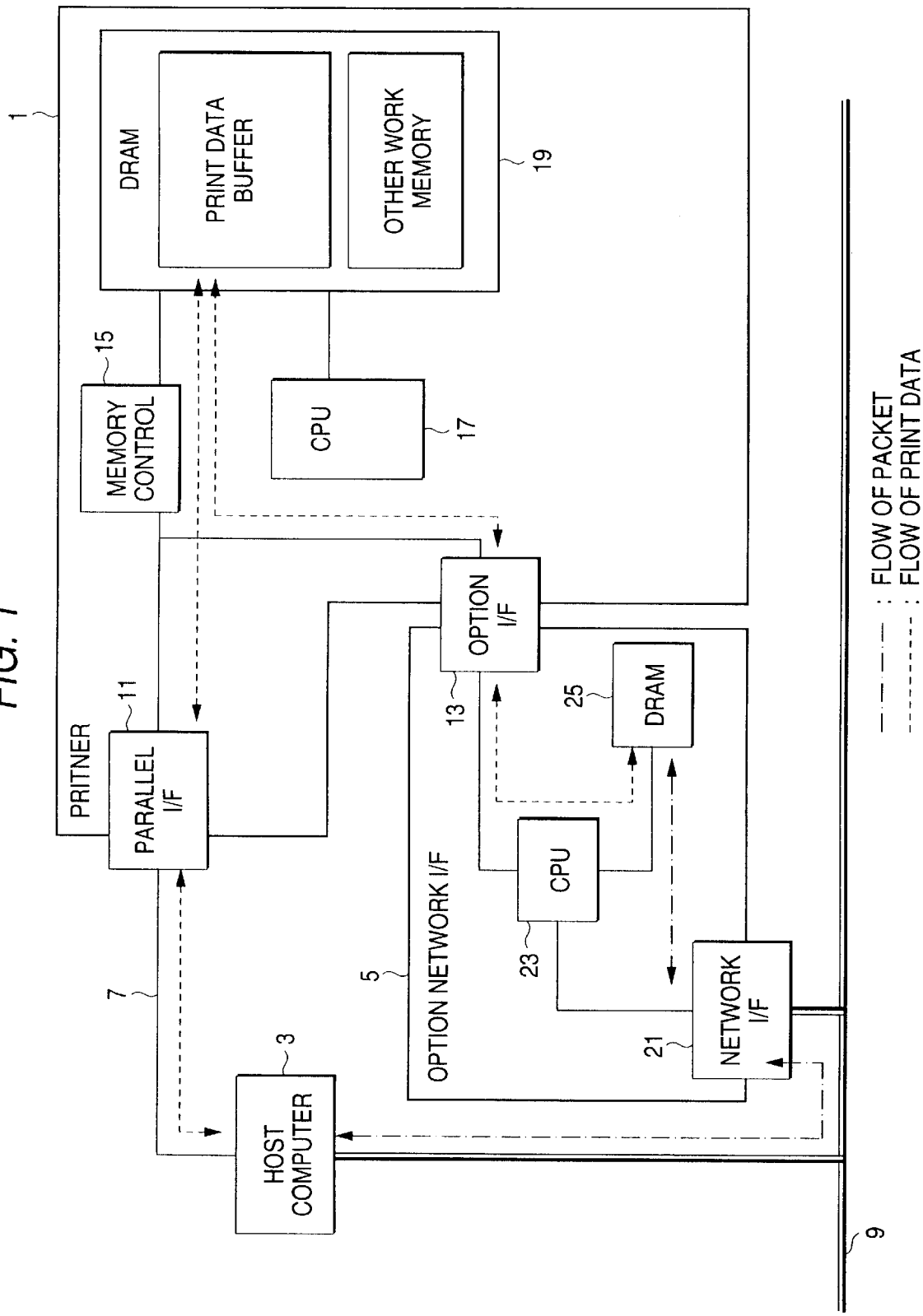
FIG. 1 is a block diagram showing the arrangement of the main portion of a conventional network printer.

Thus, in the case of using such a communication protocol as the latter communication protocol, the WDT task 69 is activated in association with the activation of the communication task 63 (that is, substantially simultaneous with the reception of a packet). Therefore, even if the communication task 63 is blocked, the WDT task 69 serves to return a suitable response (for example, a packet representing a busy state) before the partner side disconnects the connection, whereby the connection can be maintained. Incidentally, in the conventional printer shown in FIG. 1, the CPU 23 within the network interface board 5 executes the communication task independently from the CPU 17 which executes the printer firmware (the language task and the print task) within the main body of the printer 1. Thus, there does not arise such a problem that the communication task is blocked due to the busy state of the printer firmware. The WDT task 69 is required in the case of executing in multiplex both the printer firmware and the communication task by the single CPU 31 like the present invention.

Since both the language task and the print task serve as the printer firmware in the conventional printer, the expression of "printer firmware" will be hereinafter used as a general term of the language task 65 and the print task 67.

Figure 4:
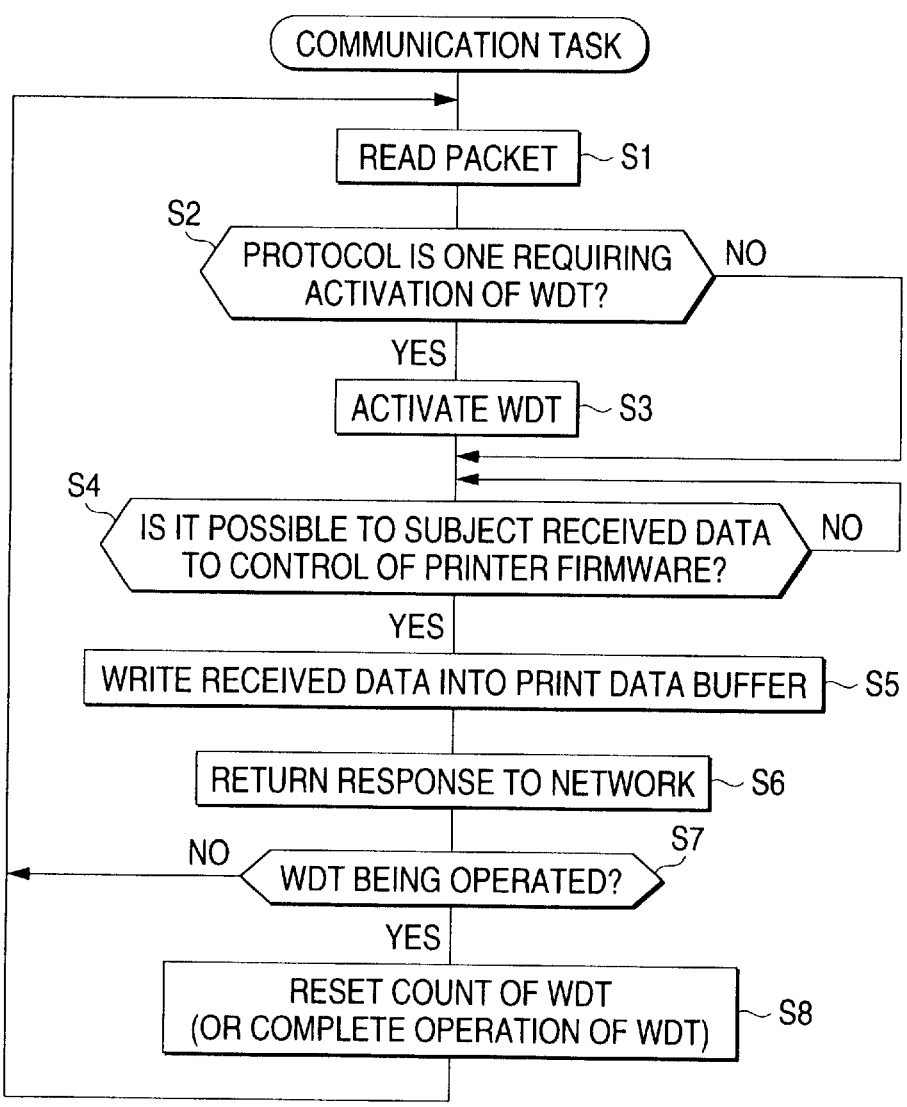
FIG. 4 is a flowchart showing the procedure where a communication task 63 activates a WDT task 69 and then processes a received packet.

FIG. 4 is a flowchart showing the procedure where the communication task 63 activates the WDT task 69 and then processes a received packet.

As shown in FIG. 4, the communication task 63 serves to read a packet written into the network work memory 351 in accordance with the communication interruption 61 (step S1), and discriminate the communication protocol of the packet thus read thereby to determine whether or not it is necessary to activate the WDT task 69 (step S3). If the discriminated protocol is TCP/IP, it is determined that the activation of the WDT task is "not necessary", while if the discriminated protocol is NetBIOS, it is determined that the activation of the WDT task is "necessary", for example. If it is determined that the activation of the WDT task is not necessary, the WDT task 69 is not activated, while if it is determined that the activation of the WDT task is necessary, the WDT task 69 is activated (step S3).

Thereafter, the communication task 63 starts to control the communication protocol having been discriminated. First, the communication task serves to determine whether or not it is possible to subject the print job data extracted from the packet to the control of the printer firmware (step S4). Typically, such a state that it is impossible to subject the print job data to the control of the printer firmware arises at the time where the printer firmware is busy, and there is no vacant area in the print data buffer 353 and so no data can be written into the print data buffer 353. In the case where the print job data can not be subjected to the control of the printer firmware (that is, in the case where it is determined to be NO in step S4), the communication task 63 is kept to be blocked until it becomes possible to subject the print job data to the control of the printer firmware (that is, typically, until a vacant area appears in the print data buffer 353). While the print data buffer is blocked, the WDT task 69 periodically returns a response representing the busy state to the network 55.

In the case where it is possible to subject the print job data to the control of the printer firmware (that is, in the case where it is determined to be YES in step S4), the communication task 63 serves to write the print job data extracted from the received packet into the print data buffer 353 (step S5). When the writing operation of the data has been completed, the communication task 63 succeedingly returns a response representing that the packet has been received normally (in other word, a response requesting the next packet) to the network 55 (step S6). Then, it is determined whether or not the WDT task 69 is operated at present (step S7). If it is determined that the WDT task is operated, the timer count of the WDT task 69 is reset to zero (or the WDT task 69 is terminated) (step S7).

When the response representing that the packet has been received normally is returned to the network 55, the host computer of the transmission originator sends the next packet in response to the response. Thus, the next packet is written into the network work memory 351 again in accordance with the communication interruption 61 and then the communication task 63 again executes the processing shown in the flowchart of FIG. 4.

Figure 5:
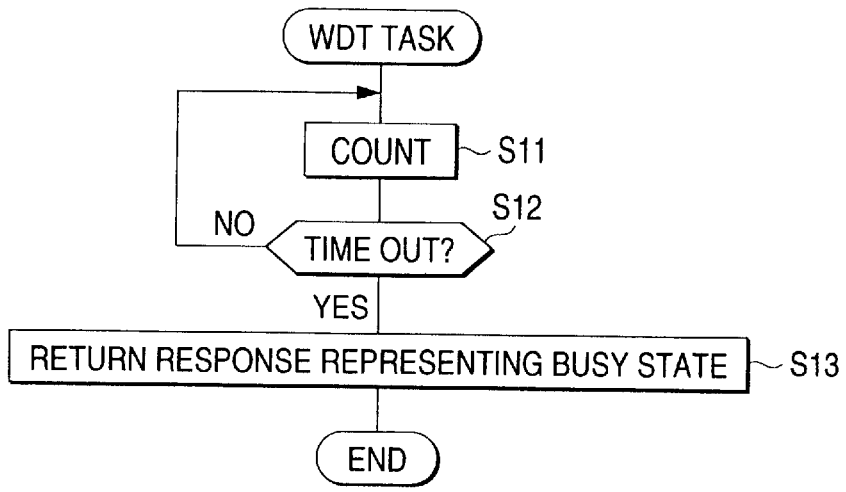
FIG. 5 is a flowchart showing the processing of the WDT task 69.

FIG. 5 is a flowchart showing the processing of the WDT task 69.

As described above, the WDT task 69 is activated by the communication task 63 substantially at the time where a packet is received from the network 55, and starts to count the time of the predetermined time period in response to the activation as shown in FIG. 5 (step S11). This predetermined time period is set to be shorter than the limit time period which is determined in a manner that the transmission side disconnects the connection when a response is not received by the transmission side within the limit time period in the current communication protocol. This limit time period may differ depending on the kind of the communication protocol or may be same among a plurality of the communication protocols. The WDT task continues to count the time until the completion of the counting of the predetermined time period (that is, until the time-out).

While the communication task 63 is executed normally, since the count of the WDT task 69 is reset when the communication task 63 returns the response representing the reception of a packet to the network 55 (or the WDT task 69 is terminated), the time-out does not occur. In contrast, as described above, if the communication task 63 is blocked for a long time due to the shortage of the vacant area of the memory, the error or the like, the time-out occurs in the WDT task 69 during the period of the blocked state (that is, in the case where it is determined to be YES in step S12). Immediately after the time-out, the WDT task 69 returns the response representing the busy state to the network 55 (step S13). Then, the WDT task 69 is terminated.

When the response representing the busy state is returned, the host computer of the transmission originator is informed that the receiving side is in a busy state and so maintains the connection to the network 55 until the busy state is cancelled. Thereafter, the communication task 63 is released from the blocked state and placed in a state ready for executing the processing shown in FIG. 4. Then, the communication task 63 returns the response representing that the packet has been received to the receiving side, and then the transmission side sends the next packet in response to the response.

Although the present invention has been explained as to one embodiment, this embodiment is merely an example for explaining the present invention and not intended that the present invention is limited to this embodiment. Accordingly, the present invention can be realized in various embodiments other than the aforesaid embodiment. For example, in the aforesaid embodiment, the data received by the input/output control circuit 45 is written in the SDRAM 35 by means of the DMA process, and the data received by the network interface circuit 51 is written in the SDRAM 35 by means of the interruption processing of the CPU, the present invention is not necessarily limited to such processes. That is, both the processings may be performed by the DMA process or the interruption processing. Further, the aforesaid former and latter processings may be performed by the process of the CPU and the DMA process, respectively. Further, although, in the aforesaid embodiment, the CPU 31 executes the three tasks of the communication, language and print tasks, the print task maybe performed by a dedicated hardware.

What is claimed is:

1. A network printer connectable to a communication network, comprising:

a network interface being coupled to said communication network so as to receive a packet from said communication network;

a single central processing unit;

a random access memory used by said central processing unit and having a print data buffer for storing print job data;

print image generation means for generating image data based on a result of interpretation of the print job data performed by said central processing unit; and a print mechanism for printing image on a recording medium on based on the image data, wherein said central processing unit includes:

communication processing means which discriminates a communication protocol used in said communication network from a packet received by said network interface circuit, extracts print job data from the received packet in accordance with the discriminated communication protocol and writes the extracted print job data into said print data buffer of said random access memory, and then returns a first response representing reception of the packet toward said communication network;

language processing means which interprets the print job data within said print data buffer; and watch dog timer means which, in a case where the discriminated communication protocol is such a kind of protocol that a transmission side disconnects a connection to a receiving side when the transmission side does not receive a response from the receiving side within a limit time period after transmission of the packet, returns a predetermined second response within the limit time period toward said communication network in place of said communication processing means when said communication processing means does not return a response representing reception of the packet within the limit time period.

2. A network printer according to claim 1, wherein said watch dog timer means is activated substantially when said network interface circuit receives the packet to count during a predetermined period shorter than the limit time period so long as said communication processing means does not return the first response, and returns the second response due to time-out of a count.

3. A network printer according to claim 1, wherein said communication processing means activates said watch dog timer means when said communication processing means discriminates the communication protocol to determine that the discriminated communication protocol is a predetermined kind of protocol.

4. A network printer according to claim 1, wherein said random access memory further includes a network work memory for storing the packet from said network interface circuit, and said central processing unit further includes communication interruption means for writing the packet into said network work memory as a interruption processing when said network interface circuit receives the packet.

5. A network printer according to claim 1, wherein said communication processing means, said language processing means and said watch dog timer means are tasks of said central processing unit, respectively.

6. A network printer according to claim 5, wherein the task of said communication processing means is provided with a priority level higher than a priority level of the task of said language processing means, and said central processing unit executes the task with a higher priority level in preference to the task with a lower priority level.

7. A network printer according to claim 5, wherein said image generation means is also a task of said central processing unit.

8. A network printer according to claim 7, wherein, of the three tasks of said communication processing means, said language processing means and said image generation means, the task of said image generation means is provided with a highest priority level, the task of said communication processing means is provided with a secondary priority level, and the task of said language processing means is provided with a lowest priority level, and wherein said central processing unit executes the task with a higher priority level in preference to the task with a lower priority level.

* * * * *